C. JORGENSEN.
SALT AND PEPPER SHAKER.
APPLICATION FILED OCT. 1, 1919.
1,328,568.
Patented Jan. 20, 1920.
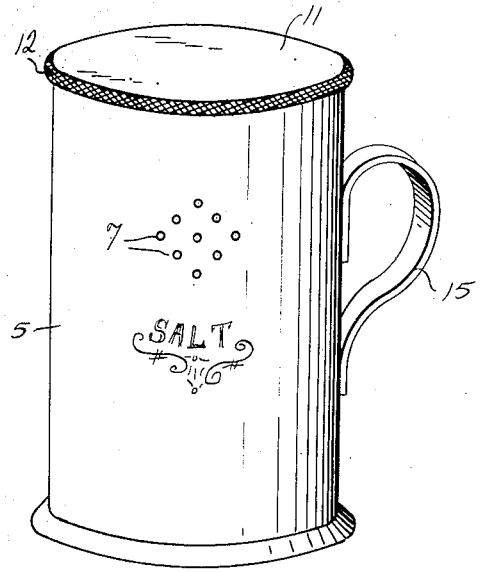
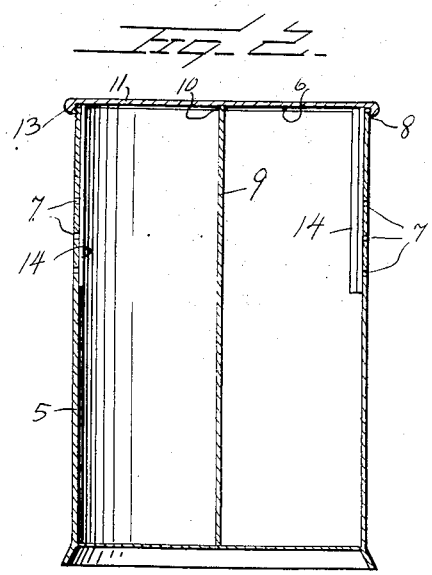
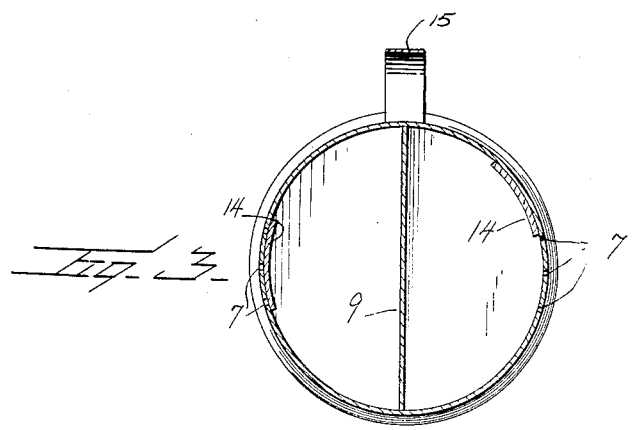
Inventor
C. Jorgensen
By Watson E. Coleman
Attorney

UNITED STATES PATENT OFFICE.

CHARLES JORGENSEN, OF NEW ORLEANS, LOUISIANA.

SALT AND PEPPER SHAKER.

1,328,568.　　　　　Specification of Letters Patent.　　Patented Jan. 20, 1920.

Application filed October 1, 1919. Serial No. 327,614.

*To all whom it may concern:*

Be it known that I, CHARLES JORGENSEN, a citizen of the United States, residing at New Orleans, in the parish of Orleans and State of Louisiana, have invented certain new and useful Improvements in Salt and Pepper Shakers, of which the following is a specification, reference being had to the accompanying drawings.

This invention relates to salt and pepper shakers, and has for its object to provide a device of this character having openings in its sides to facilitate the discharge of the salt and pepper without danger of the same moving suddenly in a mass over the openings and clogging them.

Another object is to provide a device of this character having a cover which not only closes the upper end of the casing, but also provides means for opening and closing the openings in the sides of the casing.

Another object is to provide a salt and pepper shaker including means which serve to open and close the openings in the sides of the casing and to also keep the openings clean by preventing the accumulation of salt or pepper around the openings, through frictional engagement with the wall of the casing.

These objects are attained by the mechanism illustrated in the accompanying drawings, in which:—

Figure 1 is a perspective view of a salt and pepper shaker constructed in accordance with my invention;

Fig. 2 is a longitudinal sectional view;

Fig. 3 is a transverse sectional view showing the relative position of the shutter plates.

Referring to these drawings, 5 designates a cylindrical casing having an open end 6. The side walls of the casing 5 diametrically opposite each other have a series of openings 7 through which the salt or pepper is discharged. These openings are positioned intermediately of the sides so that when the contents are being discharged, it will not move in a mass toward the openings to clog the same, as is common with the shakers having openings in their ends, but instead the mass of salt will partially pass over the openings, which prevents the mass from applying pressure to the salt or pepper nearest the openings to clog the same. The open end of the casing is partially threaded, as at 8, the purpose of which will be hereinafter explained.

Positioned in the casing centrally thereof is a vertical partition 9 which snugly engages the side walls and bottom of the casing, and has its upper end 10 projecting a slight distance above the upper edge of the casing 5. This partition divides the casing into two compartments and is so positioned that one series of openings 7 communicates with each compartment.

In order to close the upper end of the casing and alternately close the openings 7, a cover 11 is provided and includes a knurled flange 12, the interior surface of the flange being threaded, as at 13, and adapted to engage the threads 8 of the casing 5, the end 10 of the partition snugly engaging the lower surface of the cover to prevent communication between the compartments. By this means the cover is not only held in engagement with the casing, but is also permitted to oscillate to open and close the openings 7.

Depending from the flange of the cover is a pair of shutter plates 14, the plates being constructed to conform to the interior surface of the walls of the casing so as to firmly engage the same. The plates 14 are disposed in off-set, diametrical relation to each other so that when one plate closes the openings in one compartment, the openings in the adjacent compartment are opened, and vice versa, so that an alternating operation of opening and closing the openings in each compartment is provided. The frictional engagement of the plates 14 with the side walls of the casing not only serves to close the openings of the compartments, but removes any salt or pepper that may accumulate around the openings so that clogging is eliminated.

In the use of the device, after the salt and pepper have been deposited in their respective compartments, the cover 11 is screwed on the top of the casing. By oscillating the cover, the plate 14 can be moved over the openings 7 to close the same, and as stated above, in view of the fact that the plates are off-set in diametrical relation to each other, when one series of openings is closed, the other series is opened. During the operation of closing and opening the openings, the frictional engagement of the plates also serves to keep the openings clean to prevent clogging. To facilitate the discharge of the salt and pepper from their respective compartments, a handle 15 is carried by the casing and is disposed in alinement with the partition 9 so that the casing can be grasped by the user at any time without placing his fingers over or near the openings and thereby permits the unobstructed discharge of the salt or pepper as desired. Furthermore, when only a small portion of salt or pepper is desired, just a slight oscillation of the cover will permit only a few of the openings to be opened to permit a limited quantity of salt or pepper to be discharged.

From the foregoing, it will be readily seen that this salt and pepper shaker, while it is simple and compact in form, contains elements, each of which performs more than one important function, and each of which eliminates the great disadvantage now possessed by the common form of separate salt and pepper shakers.

I claim:—

1. A salt and pepper shaker comprising a casing having a plurality of openings in its sides, a vertical partition in said casing, a helical movable operating cover for the top of said casing, and shutter plates carried by and helically movable with the cover over openings.

2. A salt and pepper shaker comprising a casing exteriorly threaded at its upper portion and having a plurality of openings in its sides, a vertical partition in said casing, an interiorly threaded and helically movable operating cover for the top of said casing, shutter plates carried by the cover and depending into the compartment for closing the openings in the sides thereof, said partition being arranged to confine the helical movement of said shutter to their respective compartments.

3. A salt and pepper shaker comprising a casing, a vertical partition dividing the casing into two compartments and extending above the casing, the intermediate side walls of the casing opposite each side of the partition having a series of openings communicating with each compartment, a helically movable operating cover for said casing to permit access to the compartments, and shutter plates carried by the cover and extending into the casing in spaced, off-set, diametrical relation to each other, one of said shutter plates being disposed in each compartment, said shutters being simultaneously and helically movable with the cover.

In testimony whereof I hereunto affix my signature.

CHARLES JORGENSEN.